United States Patent
McGee et al.

(10) Patent No.: US 6,385,508 B1
(45) Date of Patent: May 7, 2002

(54) LEAD-THROUGH TEACH HANDLE ASSEMBLY AND METHOD OF TEACHING A ROBOT ASSEMBLY

(75) Inventors: H. Dean McGee, Rochester Hills; Eric C. Lee, Bloomfield Hills; Robert V. Bauer, Clarkston; Peter J. Swanson, Lake Orion; Sai-Kai Cheng, Rochester Hills; Chi-Keng Tsai, Bloomfield Hills; Yi Sun, West Bloomfield, all of MI (US)

(73) Assignee: Fanuc Robotics North America, Inc., Rochester, MI (US)

(*) Notice: Subject to any disclaimer, the term of this patent is extended or adjusted under 35 U.S.C. 154(b) by 0 days.

(21) Appl. No.: 09/702,571

(22) Filed: Oct. 31, 2000

(51) Int. Cl.$^7$ .............................................. G05B 19/04

(52) U.S. Cl. ...................... 700/254; 700/245; 700/251; 700/252; 700/253; 700/86; 700/264; 318/568.11; 318/568.12; 318/568.13; 318/568.14; 318/568.15; 901/2; 901/7; 901/9; 901/50; 701/2; 701/23; 285/189

(58) Field of Search .................... 700/254, 253, 700/218, 251, 252, 245, 256, 257, 217, 214, 264, 86; 318/568.11–568.15; 901/23, 26, 50, 25, 7, 9; 701/23, 2; 285/189

(56) References Cited

U.S. PATENT DOCUMENTS

| | | | |
|---|---|---|---|
| 4,224,501 A | 9/1980 | Lindbom et al. | |
| 4,283,764 A | 8/1981 | Crum et al. | |
| 4,367,532 A | 1/1983 | Crum et al. | |
| 4,408,286 A | 10/1983 | Kikuchi et al. | |
| 4,764,883 A | 8/1988 | Nakagawa et al. | |
| 4,805,477 A | * 2/1989 | Akeel ...................... | 74/490.05 |

(List continued on next page.)

FOREIGN PATENT DOCUMENTS

| | | |
|---|---|---|
| JP | 61273610 | 12/1986 |
| JP | 2116906 | 5/1990 |
| JP | 5192885 | 8/1993 |
| JP | 8336785 | 12/1996 |

OTHER PUBLICATIONS

Suh et al., A prototype integrated robotic painting system: Software and Hardware Development, 1993, IEEE, pp. 475–482.*

Primary Examiner—William A. Cuchlinski, Jr.
Assistant Examiner—McDieunel Marc
(74) Attorney, Agent, or Firm—Howard and Howard (57) ABSTRACT

A method of teaching a robot a desired operating path and a lead-through teach handle assembly are disclosed. A mounting mechanism mounts the entire handle assembly to an arm of the robot. The handle assembly also includes a handle that is supported by the mounting mechanism. A robot operator utilizes the handle assembly and grasps the handle to apply an external force to move the robot arm, or the operator, without the handle assembly, directly holds a tool connected to the robot arm to apply the external force at the tool. The handle assembly is characterized by a universal joint that interconnects the handle and the mounting mechanism and that accommodates orientation changes of the handle relative to the mounting mechanism that result from translational and rotational movement of the robot arm as the user is teaching the robot. The external force applied at the tool is estimated with either a force sensor disposed on the handle assembly or by monitoring the torque of motors used to move the robot. Motion commands are generated in response to the estimated force to power assist the operator in moving the robot arm. During teaching of the robot, the operator selects either a translational operating mode which limits the movement imparted on the tool only to translational movement, or a rotational operating mode which limits the movement imparted on the tool only to rotational movement.

40 Claims, 3 Drawing Sheets

U.S. PATENT DOCUMENTS

| | | | |
|---|---|---|---|
| 4,973,215 A | 11/1990 | Karlen et al. | |
| 4,984,175 A | 1/1991 | Toyoda et al. | |
| 5,051,675 A | 9/1991 | Okumura et al. | |
| 5,103,149 A | 4/1992 | Kimura et al. | |
| 5,155,423 A | 10/1992 | Karlen et al. | |
| 5,465,037 A | * 11/1995 | Huissoon et al. | 318/568.11 |
| 5,495,410 A | * 2/1996 | Graf | 700/86 |
| 5,581,166 A | 12/1996 | Eismann et al. | |
| 5,617,515 A | 4/1997 | MacLaren et al. | |
| 5,748,854 A | 5/1998 | Watanabe et al. | |
| 5,783,922 A | * 7/1998 | Hashimoto et al. | 318/568.14 |
| 5,833,569 A | * 11/1998 | Schnell | 475/341 |
| 5,880,956 A | * 3/1999 | Graf | 700/86 |
| 6,088,628 A | * 7/2000 | Watanabe et al. | 700/264 |
| 6,125,715 A | * 10/2000 | Nissfold et al. | 700/218 |
| 6,246,923 B1 | * 6/2001 | Sugimura et al. | 700/218 |
| 6,285,920 B1 | * 9/2001 | McGee et al. | 700/254 |

* cited by examiner

LEAD-THROUGH TEACH HANDLE ASSEMBLY AND METHOD OF TEACHING A ROBOT ASSEMBLY

BACKGROUND OF THE INVENTION

1) Technical Field

The subject invention relates to a lead-through teach handle assembly for assisting a user, such as a robot operator, in teaching a desired operating path to a robot assembly within a workspace of the robot assembly. The subject invention also relates to a method of lead-through teaching the robot assembly the desired operating path within the workspace.

2) Description of the Prior Art

Various methods of lead-through teaching and handle assemblies utilized for lead-through teaching are known in the art. As appreciated, these conventional methods and assemblies are utilized to teach a desired operating path to a robot assembly in a robot workspace. Such methods and assemblies are integral throughout industry for subsequent play-back of the desired operating path that has been taught to the robot assembly such that a tool mounted to an arm of the robot assembly can operate on a particular workpiece.

Examples of conventional lead-through teach handle assemblies are disclosed in U.S. Pat. No. 5,495,410 to Graf; U.S. Pat. No. 4,408,286 to Kikuchi et al.; and U.S. Pat. No. 4,367,532 to Crum et al. These handle assemblies are deficient for various reasons. Specifically, the handle assembly disclosed in the '410 patent to Graf is deficient in that the handle assembly is rigidly attached, i.e., not detachably mounted, to the robot assembly. Rigid attachment of the handle assembly to the robot assembly makes the handle assembly very difficult to grasp for the operator as the operator moves the robot assembly translationally and rotationally during the method of lead-through teaching. That is, it is very difficult for operators to maintain their grasp when it is necessary to make large orientation changes with the robot assembly during the method of teaching. Rigid attachment of the handle assembly may also endanger the safety of the operator during lead-through teaching in cases where the robot assembly inadvertently malfunctions and erratically moves in a direction with excessive force while the operator is grasping the handle assembly. The assembly disclosed in this patent is further deficient in that the assembly requires a six-degree of freedom digitizing arm to teach the desired operating path to the robot assembly. As understood by those skilled in the art, assemblies incorporating six-degree of freedom digitizing aims are inconvenient and expensive.

The handle assemblies disclosed in both the '286 patent to Kikuchi et al. and the '532 patent to Crum et al. are deficient because, similar to that described above, these handle assemblies are also rigidly attached to the robot assembly. Consequently, as discussed above, these handle assemblies are awkward to the operator when making large orientation changes during lead-through teaching and may also endanger the safety of the operator. The assembly disclosed in the '286 patent to Kikuchi et al. is further deficient in that the assembly requires a six-degree of freedom force sensor. As understood by those skilled in the art, six-degree of freedom force sensors are expensive.

Examples for conventional methods of lead-through teaching are disclosed in Patent Abstracts of Japan Publication Nos. 61273610 A to Yasuo et al.; 08336785 A to Hideo; and 05192885 to Keiji et al. These methods are deficient for various reasons. The method disclosed in the '610 abstract to Yasuo et al. monitors the torque of a motor within the robot assembly to assist the operator in lead-through teaching of the robot assembly. More specifically, the method disclosed in the '610 abstract to Yasuo utilizes the monitored motor torque and adjusts the motor to supplement movement imparted on the tool by the operator while lead-through teaching of the robot assembly. The method disclosed in this abstract is particularly deficient in that the method does not monitor motor torque to command translational or rotational movement other than at the motor. This method monitors the motor torque and only adjusts the motor in response to a specific force on a particular motor. That is, in this abstract, movement is only with respect to the external force monitored at a particular motor and there is no differentiation between translational and rotational movement. The method disclosed in the '610 abstract to Yasuo does not consider a tool center point (TCP) and an orientation of the tool as factors for adjusting the motor. As such, with this method, robot operators have considerable difficulty in moving the robot arm while maintaining a spacial relationship between the tool and the robot workspace.

Continuing, the '785 abstract to Hideo discloses a method of teaching a robot assembly by an indirect teaching method. In such indirect teaching methods, a teaching tool, which is utilized to apply the external force for imparting the necessary movement on the robot assembly during lead-through teaching, is disconnected from or not a part of the robot assembly. That is, the external force is not applied at the tool mounted to the robot assembly. The method disclosed in this abstract is deficient in that the operator is not directly manipulating the tool on the robot assembly to apply the external force. Instead, in this method, the operator is isolated from the tool of the robot assembly and it is generally understood throughout the art that teaching of the robot assembly is less effective.

The '885 abstract to Keiji et al. discloses a robot assembly that includes a sensor for detecting motor torque. The sensor detects motor torque to facilitate a method of lead-through teaching of the robot assembly. The method disclosed in this abstract is deficient in that the method does not disclose more than one teach operating mode that differentiates between translational and rotational movement of the robot assembly during lead-through teaching. As such, the method of lead-through teaching is less controlled for the operator. Furthermore, it is understood that sensors and controllers utilized to interpret data detected in these types of uncontrolled methods of lead-through teaching would require more technological sophistication as well as a corresponding higher cost.

Due to the inefficiencies identified above with respect to the conventional handle assemblies and the conventional methods of lead-through teaching, it is desirable to implement a novel lead-through teach handle assembly as well as a novel method of lead-through teaching a desired operating path to a robot assembly. More specifically, it is desirable to implement a lead-through teach handle assembly that is not rigidly attached to the robot assembly such that large orientation changes of the handle assembly that result from translational and rotational movement of the robot arm during teaching can be accommodated. It is also ideal for the lead-through teach handle assembly of the subject invention to maximize the safety of the operator.

The method of lead-through teaching introduced according to the subject invention does not utilize a teaching tool that is disconnected from or not part of the robot assembly to apply the external force required to move the robot assembly. Furthermore, the method of the subject invention selects between two different teach operating modes, if necessary, to present a controlled method of lead-through teaching the desired operating path to the robot assembly. Additionally, costly six-degree of freedom force sensor are not required and therefore can be eliminated in both the teach handle assembly and the method of lead-through teaching presented in the subject invention.

SUMMARY OF THE INVENTION AND ADVANTAGES

A method of lead-through teaching a robot assembly and a handle assembly utilized in such a method are disclosed. The method of lead-through teaching and handle assembly of the subject invention assist a user, such as a robot operator, in teaching a desired operating path to the robot assembly within a workspace of the robot assembly. The robot assembly includes at least one robot arm having at least one mounting site. The robot assembly additionally includes a tool having a tool center point and an orientation.

The handle assembly of the subject invention includes a mounting mechanism. The mounting mechanism is adapted to be mounted to the mounting sites on the robot arm. The handle assembly further includes a handle that is supported by the mounting mechanism. The handle is adapted to provide at least one surface for the user to grasp: As such, the user can apply an external force that is required to move the arm of the robot assembly along the desired operating path.

The handle assembly of the subject invention is characterized by first and second joint members that are coupled together. More specifically, the first joint member is mounted to the handle, and the second joint member is mounted to the mounting mechanism. The first and second joint members interconnect the handle and the mounting mechanism. The first and second joint members accommodate orientation changes of the handle relative to the mounting mechanism that result from translational and rotational movement of the robot arm as the user is teaching the robot assembly the desired operating path.

As noted above, a method of lead-through teaching the desired operating path to the robot assembly is also disclosed. The method of the subject invention includes the step of applying an external force at the tool to impart movement on the robot arm. The external force causes the arm of the robot assembly to move along the desired operating path. To apply the external force in the subject invention, the operator can manipulate the lead-through teach handle, including the first and second joint members, that is mounted on the robot arm. Alternatively, without the lead-through teach handle, the operator may manually hold the tool of the robot assembly and simply lead the tool and the robot arm through the desired operating path. The imparted movement is at least one of translational movement and rotational movement. That is, the movement imparted on the robot arm is either translational movement, rotational movement, or both translational and rotational movement.

Next, the method of the subject invention estimates the external force applied at the tool and generates motion commands in response to the external force. The motion commands that are generated supplement the movement imparted on the tool in a direction of the estimated external force. Therefore, the robot operator is assisted in moving the robot arm.

The subject invention continues by selecting at least one teach operating mode. The teach operating mode is selected by the operator depending upon the desired operating path to be taught. The selected teach operating mode distinguishes between a translational operating mode and a rotational operating mode. More specifically, the translational operating m ode defines a first three-degrees of freedom and limits the movement imparted on the tool to translational movement. As such, a first spacial relationship defined between the orientation of the tool and the workspace is maintained during lead-through teaching of the robot assembly. On the other hand, the rotational operating mode defines a second three-degrees of freedom and limits the movement imparted on the tool to rotational movement. As such, a second spacial relationship defined between the tool center point and the workspace is maintained during lead-through teaching of the robot assembly.

Accordingly, the subject invention provides a lead-through teach handle assembly including first and second joint members that are coupled together and that interconnect a handle and a mounting mechanism mounted to the robot assembly such that large orientation changes of the handle assembly that result from translational and rotational movement of the robot arm during teaching are accommodated. The first and second joint members provide only three-degrees of freedom such that movement of the robot assembly is limited to no more than three-degrees of freedom, either translational movement or rotational movement, and a more cost effective force sensor, such as a three-degree of freedom force sensor, can be utilized. Furthermore, the lead-through teach handle assembly of the subject invention is detachable from the robot assembly during lead-through teaching of the robot assembly such that safety of the operator is maximized.

The subject invention also provides a method of lead-through teaching that applies an external force required to move the robot assembly at a tool mounted to the robot assembly. Also, the method provided selects between a translational and rotational teach operating mode, if necessary, to present a controlled method of lead-through teaching that limits the movement imparted on the tool, if necessary, to translational movement or rotational movement. As such, more cost effective mechanisms for sensing force, other than six-degree of freedom force sensors can be utilized.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Referring to the Figures, wherein like numerals indicate like or corresponding parts throughout the several views, a robot assembly and a lead-through teach handle assembly are generally shown at 10 and 12, respectively. It is understood in the art that the robot assembly 10 may also be referred to as a robot. For descriptive purposes only, the subject invention is described below only in terms of the robot assembly 10. The robot assembly 10 and the handle assembly 12 assist a user, such as a robot operator 14, in teaching a desired operating path to the robot assembly 10 within a workspace of the robot assembly 10.

Figure 1:
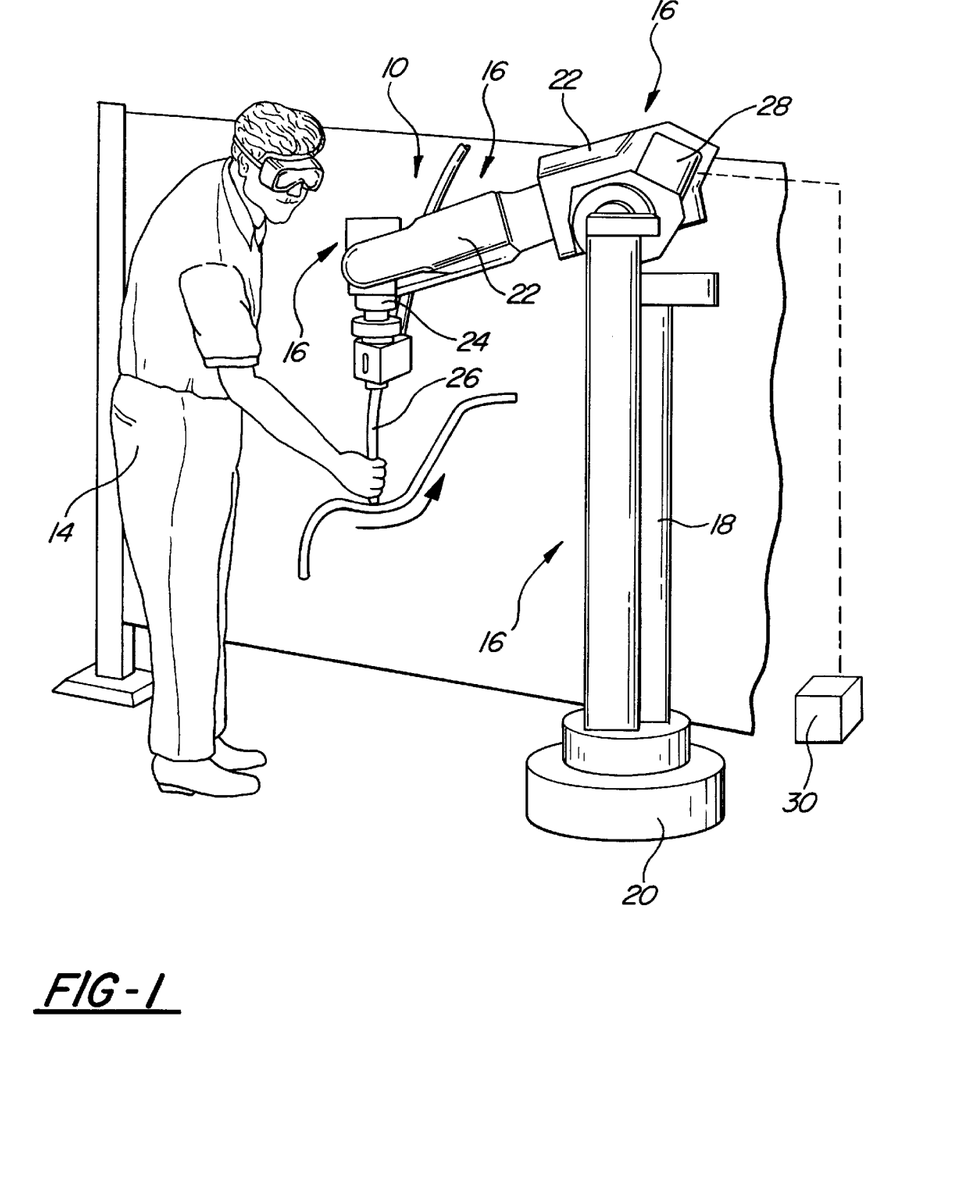
FIG. 1 is a perspective view of a robot operator manually holding a tool of a robot assembly and leading the tool and the robot assembly through a desired operating path.

Referring specifically to FIG. 1, the robot assembly 10 includes at least one robot arm 16. As shown in the Figure, the at least one robot arm 16 is more specifically defined to include a base arm 18 connected to a robot base 20, a main arm 22 connected to the base arm 18, and a wrist arm 24 that supports a tool 26 and that is connected to the main arm 22. The robot assembly 10 may include a plurality of wrist arms. The tool 26 includes a particular tool center point (TCP) and a particular orientation both relative to the workspace of the robot assembly 10. It is to be understood that the tool 26, also referred to in the art as an end effector, can be any tool appropriate for conducting various operations on a workpiece including, but not limited to, welding tools, drilling tools, gripping tools, water-jet tools, cutting tools, and laser tools. The robot assembly 10 also includes at least one motor 28 for 'driving' or moving the robot arms 16 relative to one another. As appreciated by those skilled in the art, there is preferably one motor 28 for driving the robot arms 16 integrally disposed at the point where the robot arms 16 connect to one another. Therefore, although not shown in the Figures, there is preferably more than one motor utilized for the robot assembly 10. The points where the robot arms 16 connect to one another are referred to in the art as robot axes. The robot assembly 10 also includes a controller 30, the operation of which will be discussed further below.

Figure 2:
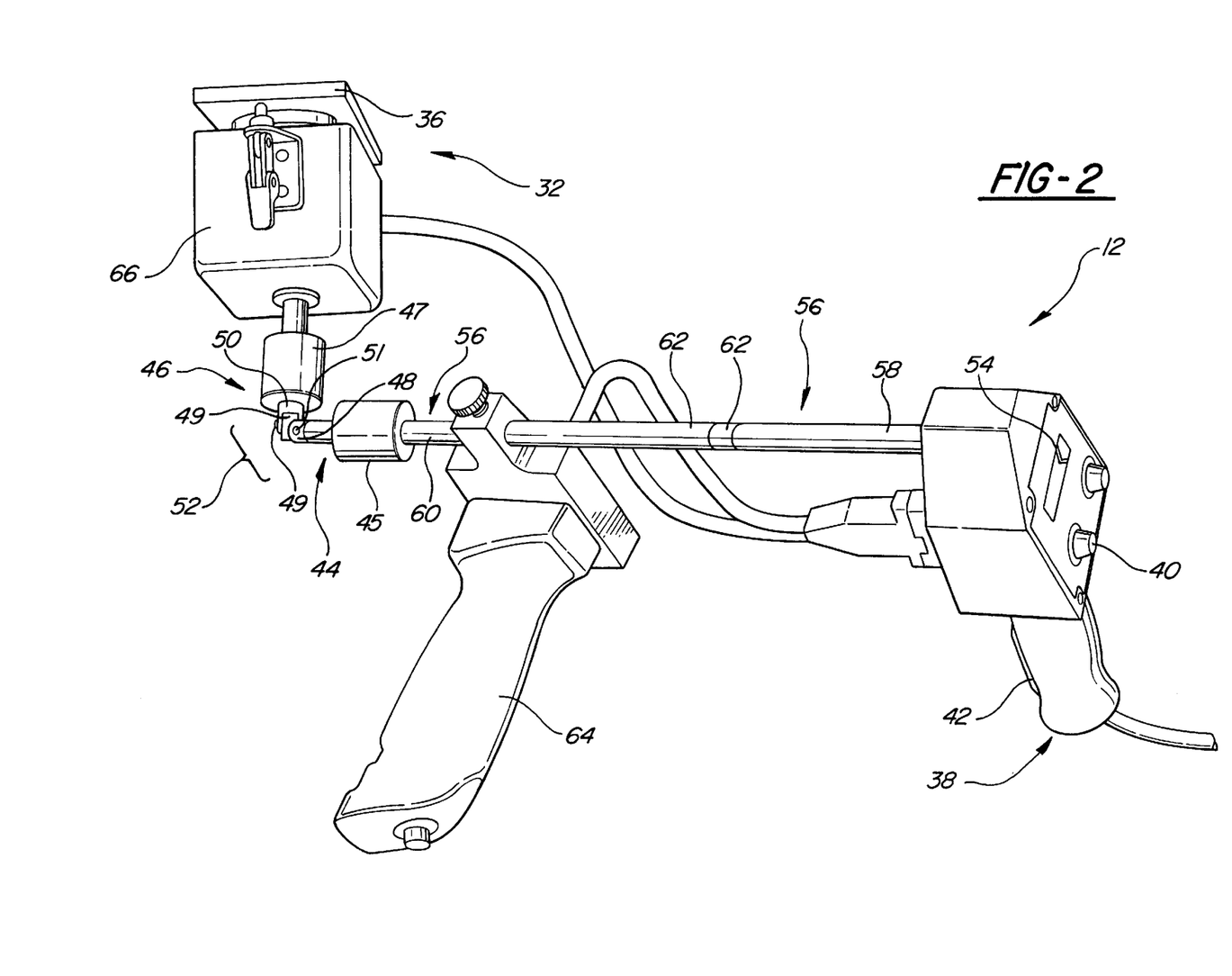
FIG. 2 is a perspective view of the handle assembly.
Figure 3:
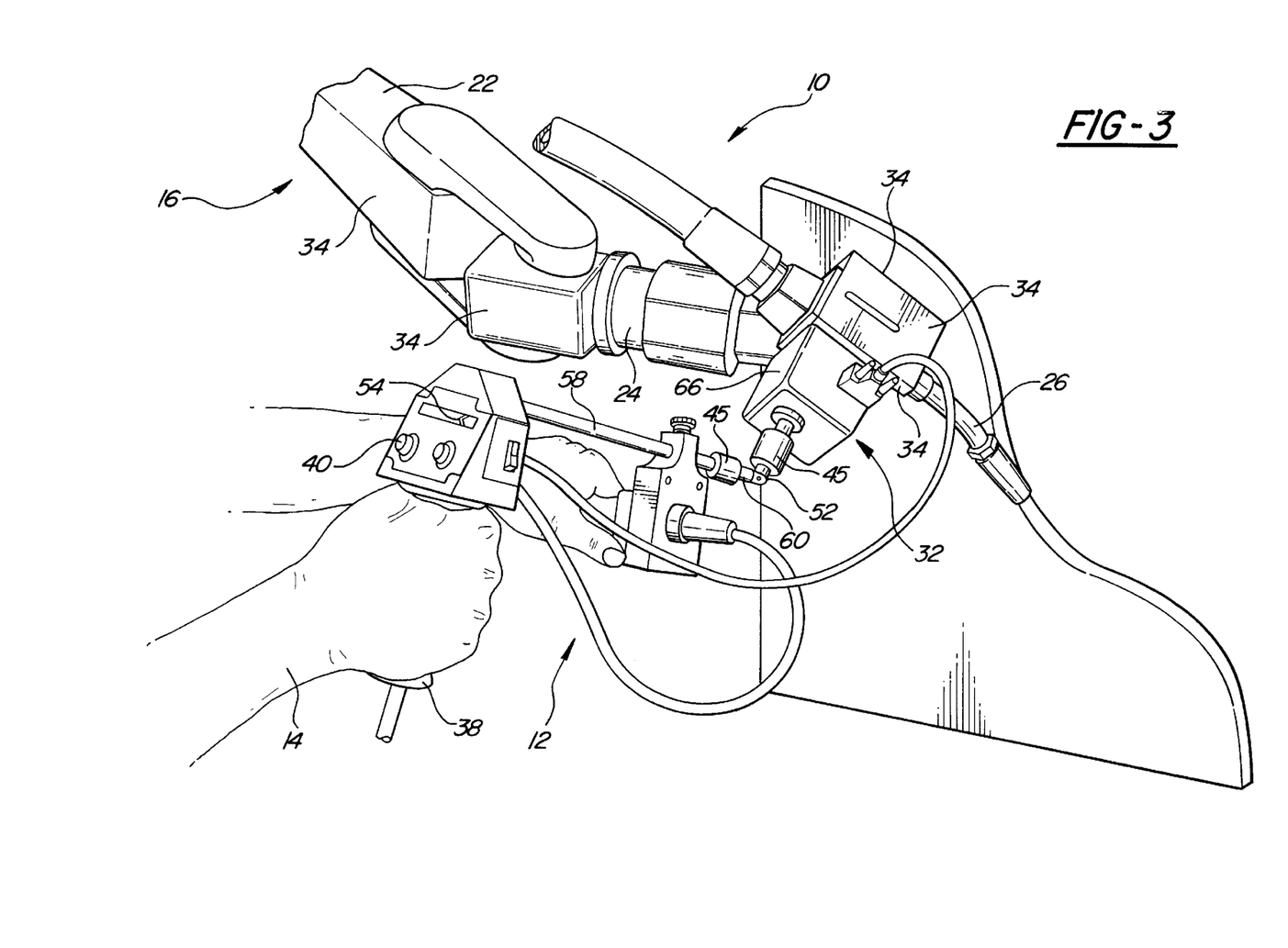
FIG. 3 is a perspective view of the robot operator using a lead-through teach handle assembly to teach the desired operating path to the robot assembly.

Referring now primarily to FIGS. 2 and 3, the lead-through teach handle assembly 12 of the subject invention includes a mounting mechanism 32 mounted to at least one mounting site 34 on the arm of the robot assembly 10. In the preferred embodiment of the subject invention there are various mounting sites 34 on the robot arm 16. The mounting mechanism 32 mounts the entire handle assembly 12 to the robot assembly 10. FIG. 3 shows the handle assembly 12 mounted to the wrist arm 24 of the robot assembly. However, as will be described further below, other mounting sites 34 for the robot assembly may be preferred. In the preferred embodiment of the subject invention, the mounting mechanism 32 is further defined as a magnetic mounting device 36. The magnetic mounting device 36 enables the entire handle assembly 12 to be detachably mounted to the various mounting sites 34 on the robot arm 16. As will be described further below, the entire handle assembly 12 is detached from the robot arm 16 when an external force applied by the operator 14 to the robot arm 16 exceeds a predetermined force limit.

The handle assembly 12 also includes a handle 38 supported by the mounting mechanism 32. As shown in FIGS. 2 and 3, the handle 38 provides at least one surface for the operator 14 to grasp. In the preferred embodiment of the subject invention, the handle 38 has a symmetric handgrip shape which addresses ergonomic issues such as differences in size and handedness of robot operators 14. In operation, the operator 14 uses the handle 38 to apply an external force required to move the arm 16 of the robot assembly 10 along the desired operating path. This will be discussed further below. A position-record button 40 is disposed on the handle 38. The position-record button 40 records a position of the robot assembly 10 along the desired operating path. The subject invention also includes a deadman switch 42 disposed on the handle 38. The deadman switch 42 extends outwardly from the surface provided by the handle 38. More specifically, the deadman switch 42 operates between a first position where the deadman switch 42 is depressed by the operator 14 and a second position where the deadman switch 42 is released by the operator 14. In the first position, the robot assembly 10 is activated such that teaching of the robot assembly 10 is possible, and in the second position, the robot assembly 10 is deactivated such that teaching of the robot assembly 10 is not possible. It is to be understood that the deadman switch 42 can alternatively be disposed on a hand support 64. The hand support 64 will be discussed further below.

The lead-through teach handle assembly 12 is characterized by a first joint member 44 mounted to the handle 38 and a second joint member 46 mounted to the mounting mechanism 32. The first and second joint members 44, 46 are coupled together to interconnect the handle 38 and the mounting mechanism 32. The first and second joint members 44, 46 coupled together provide three-degrees of freedom of rotational movement of the handle assembly 12 relative to the robot assembly 10. As such, orientation changes of the handle 38 relative to the mounting mechanism 32 that result from either translational or rotational movement of the robot arm 16 during teaching of the robot assembly 10 can be accommodated. Preferably, the first joint member 44 is further defined as a first connection yoke 48 and a first rotational coupling 45, and the second joint member 46 is further defined as a connection yoke 50 and a second rotational coupling 47. As known in the art, the connection yokes 48, 50 typically have a U-shaped configuration, and a journal 49 is disposed within the connection yokes 48, 50 and connected to the connection yokes 48, 50 via pins 51 to provide two-degrees of freedom. The rotational couplings 45, 47 add a third-degree of freedom, a degree of rotational freedom. Therefore, the rotational couplings 45, 47 are coupled together with the yokes 48, 50 to establish a universal joint 52 that provides the three-degrees of freedom of rotational movement to the handle assembly 12. As shown in the Figures, the rotational couplings 45, 47 are mounted on and parallel to an extension shaft 56. The extension shaft 56 will be discussed further below. Alternatively, the rotational couplings 45, 47 can be incorporated integral to, i.e., within, the first and second joint members 44, 46, respectively.

In addition to the position-record button 40 and the deadman switch 42, the handle assembly 12 further includes an operating mode switch 54 disposed on the handle 38 for allowing the operator 14 to select at least one teach operating mode. In practice, the teach operating mode that the operator 14 selects depends upon the desired operating path to be taught. When the operator 14 is teaching the robot assembly 10 the desired operating path, the operating mode switch 54 enables the operator 14 to select and limit the movement of the robot assembly 10 to either translational or rotational movement. To accomplish this, the operator 14 selects the at least one teach operating mode to be either a translational operating mode or a rotational operating mode. The translational operating mode defines a first three-degrees of freedom (x, y, z) of movement, i.e., translational movement, and limits the movement imparted on the tool 26 to this translational movement. As such, a first spacial relationship defined between the orientation of the tool 26 and the workspace is maintained during teaching. That is, the orientation of the tool 26 remains constant. On the other hand, the rotational operating mode defines a second three-degrees of freedom (w, p, r) of movement, i.e., rotational movement, and limits the movement imparted on the tool 26 to this rotational movement. As such, a second spacial relationship defined between the TCP and the workspace is maintained during teaching. That is, the TCP remains fixed.

Typically, there are several reference coordinate systems that can be defined in the robot workspace including, but not limited to a cell coordinate system, a base coordinate system, a part coordinate system, and a tool coordinate system. As appreciated by those skilled in the art, the cell coordinate system is generally fixed relative to the robot assembly 10, the base coordinate system is generally fixed at the robot base 20, the part coordinate system is generally fixed relative to the workpiece, and the tool coordinate system is generally fixed relative to the tool 26 of the robot assembly. Of course, other reference coordinate systems can also be defined. These reference coordinate systems are all typically identified by a location component defined in the first three-degrees of freedom (x, y, z) and by an orientation component defined in the second three-degrees of freedom (w, p, r) which indicates rotation about the first three-degrees of freedom (x, y, z). As understood by those skilled in the art, there are many different approaches for identifying these six-degrees of freedom by the location and orientation components, and the subject invention is to be interpreted to apply to any chosen approach for identifying.

The first spacial relationship allows motion in the first three-degrees of freedom (x, y, z) but, in an operating sub-mode, preferably referred to as a translational operating sub-mode, can be limited to one-degree (x or y or z) or two-degrees of freedom (x-y or x-z or y-z) at a time and can operate relative to any of the reference coordinate systems introduced above. The translational operating sub-mode is an alternative teach operating mode. For example, the robot operator 14 can position the tool 26 such that an x-y plane of the tool 26 is parallel to a particular teaching surface. The teaching surface is preferably a surface on the workpiece. In this example, utilizing the translational operating sub-mode to restrict motion to the two-degrees of freedom (x, y) in the x-y plane and selecting the reference coordinate system to the tool coordinate system greatly simplifies teaching of the robot assembly 10. In other examples incorporating the subject invention, it may be convenient to choose other reference coordinate systems that simplify the teaching of the robot assembly 10.

The second spacial relationship allows motion in the second three-degrees of freedom (w, p, r) but, similar to that above, in an operating sub-mode, preferably referred to as a rotational operating sub-mode, can be limited to one-degree (w or p or r) or two-degrees of freedom (w-p or w-r or p-r) at a time to provide the most natural lead-through teach rotational motion. If fewer than three-degrees of freedom (w, p, r) are used in a particular rotational operating sub-mode, the allowed rotation can be about axes in any reference coordinate system. For example, in teaching the robot assembly 10, it may be ideal for rotation of the robot assembly 10 to be grouped such that rotation about the two-degrees of freedom (x, y) in the tool coordinate system is associated with a first rotational operating sub-mode, and such that rotation about the one-degree of freedom (z) in the tool coordinate system is associated with a second rotational operating sub-mode. Similarly, it may be convenient to allow rotation with respect to the cell coordinate system or with respect to the part coordinate system. As appreciated, while rotations are indicated here as yaw, pitch, and roll (w, p, r), the rotations can be represented by other factors such as azimuth, elevation, and spin (a, e, s) without varying the scope of the subject invention.

The three-degrees of freedom provided by the first and second joint members 44, 46 correlate either to the first three-degrees of freedom (x, y, z) realized when movement is selected and limited by the operator 14 to translational movement in the translational operating mode, or to the second three-degrees of freedom (w, p, r) realized when movement is selected and limited by the operator 14 to rotational movement in the rotational operating mode. In terms of the preferred embodiment of the subject invention, the universal joint 52 and the rotational couplings 45 permit the movement of the robot arm 16 during teaching in the first three-degrees of freedom (x, y, z) when the operating mode switch 54 is selected to the translational operating mode, and permits the movement of the robot arm during teaching in the second three-degrees of freedom (w, p, r) when the operating mode switch 54 is selected to the rotational operating mode. It is to be understood that the term universal joint 52, as used descriptively in the subject application, is intended to include an type of joint, such as a ball joint, that will allow three-degrees of rotational freedom about approximately a single center of rotation.

As shown in FIGS. 2 and 3, the subject invention further includes the extension shaft 56. The extension shaft 56 is disposed between the handle 38 and the universal joint 52. The extension shaft 56 extends a reach of the operator 14 when moving the robot arm 16 along the desired path. The extension shaft 56 includes a first end 58 mounted to the handle 38 and a second end 60 mounted to the universal joint 52. The extension shaft 56 further includes a plurality of shaft sections 62 that slidably extend from one another such that the second end 60 of the extension shaft 56 telescopes outwardly from the first end 58 of the extension shaft 56. As a result, the operator's 14 reach varies, as necessary, when moving the robot arm 16 along the desired path. The handle assembly 12 also includes the hand support 64 that extends from the second end of the extension shaft 56. The hand support 64 provides a second surface for the operator 14 to grasp to assist the operator 14 in applying the external force. In the preferred embodiment of the subject invention, both the position and orientation of the hand support 64 are adjustable. The adjustability of the hand support 64 addresses ergonomic issues such as differences in size and handedness of robot operators 14.

The subject invention also includes a force sensor 66 disposed between the universal joint 52 and the mounting mechanism 32. The force sensor 66 senses the external force applied at the robot arm 16. Because the tool 26 is connected to the robot arm 16, the force sensor 66 is capable of estimating the external force applied at the tool 26 which will be discussed in greater detail below. Because the subject invention includes two distinct operating modes that can be selected, the subject invention only requires, and therefore the preferred embodiment includes, a cost effective, three-degree of freedom force sensor 66. The three-degree of freedom force sensor 66 senses each of the three-degrees of freedom of movement provided by the universal joint 52 depending on the teach operating mode selected. For instance, in the translational operating mode, the preferred three-degree of freedom force sensor 66 senses the first three-degrees of freedom (x, y, z) of movement. Alternatively, in the rotational operating mode, the preferred three-degree of freedom force sensor 66 senses the second three-degrees of freedom (w, p, r) of movement.

More specifically, in the rotational operating mode, a natural lead-through teach motion can be achieved by grouping the second three-degrees of freedom (w, p, r) into one-degree or two-degrees of freedom sub-modes. Because the TCP remains fixed in the rotational operating mode, the force sensed by the force sensor 66 can naturally be interpreted as a moment tangent to a virtual sphere centered at the TCP and having a radius extending to the force sensor 66.

This moment can be decomposed to moments with respect to one or more axes of rotation parallel to any reference coordinate system. Typically, a natural grouping of the second three-degrees of freedom (w, p, r) allows rotation about x-y axes of the tool 26 in a first operating sub-mode and about a z axis of the tool 26 in a second operating sub-mode. A natural and convenient manner of orienting a particular tool 26 can be easily accomplished if the particular tool 26 includes a tool shaft that is aligned with the z axis of the tool 26. Of course, the operating sub-modes can be defined in any grouping that is convenient and with respect to any reference coordinate system that is convenient.

As discussed above, the handle assembly 12, including the force sensor 66, can be mounted to the various mounting sites 34 on the robot arm 16 via the mounting mechanism 32. It is to be understood that the various mounting sites 34 can be at predefined locations on the robot arm 16 such that the location and orientation of the force sensor 66 which is attached to the handle assembly 12 is understood. Although not shown in the Figures, in the preferred embodiment, the force sensor 66 is to be mounted to the robot arm 16 of the robot assembly 10 independent of a robot faceplate and even independent of the wrist arm 24. Thus, the force sensor 66 can be used independent of rotations of the robot axes associated with the wrist arm 24 and the faceplate and large rotations of the tool 26 can be accommodated with a single mounting site. Where the force sensor 66 is mounted to the robot arm 16, independent of the robot faceplate and of the wrist arm 24, then the entire tool 26 and the wrist arm 24 can enter into confined spaces while the operator 14, during lead-through teaching, retains full and natural control of the robot assembly 10. Alternatively, the force sensor 66 can be mounted directly to the tool 26 when the robot operator 14 is not concerned with large rotations and confined spaces.

The method of teaching the robot assembly 10 the desired operating path according to the subject invention will now be discussed in greater detail. As discussed briefly above, in lead-through teaching of the robot assembly 10, the robot operator 14 applies the external force at the tool 26. The external force imparts movement on the robot arm 16 such that the robot arm 16 moves along the desired operating path. As discussed above, depending on the teach operating mode selected, the movement imparted on the robot arm 16 can be translational or rotational movement. There are two embodiments of the subject method invention. These two embodiments are discussed below.

To apply the external force at the tool 26, the operator 14 can either utilize the lead-through teach handle assembly 12 (a shown in FIGS. 2 and 3), or can directly hold the tool 26 (as shown in FIG. 1). As shown in FIG. 3, if the operator 14 opts to utilize the handle assembly 12 to move the robot arm 16 along the desired path, the operator 14 manipulates the handle assembly 12 that is mounted, via the mounting mechanism 32, to the robot assembly 10. When using the handle assembly 12 to teach the robot assembly 10, if the robot assembly 10 inadvertently malfunctions and erratically moves in a direction with excessive force that exceeds a predetermined force limit, then the entire handle assembly 12 detaches from the robot arm via the magnetic mounting mechanism 36 to prevent the operator 14 from being 'dragged into' contact with the robot assembly 10. Alternatively, if the operator 14 does not want to utilize the handle assembly 12 and opts to directly hold the tool 26 as shown in FIG. 1, then, to apply the external force, the operator 14 manually holds the tool 26 and then leads the tool 26, which is connected to the robot arm 16, through the desired operating path.

Although not shown in the Figures, the method of the subject invention can utilize various other handle assemblies 12 that may eliminate one or all of the extension shaft 56, the universal joint 52, and hand support 64 and instead provide a knob or other grasping means attached to the mounting mechanism 32. The method utilizing such other handle assemblies provide all the functionality of the handle assembly 12 where motion of the robot assembly 10 is in a compact workspace that is readily and directly accessible to the operator 14 without the benefits of the extension shaft 56, the universal joint 52, and the hand support 64. In these methods of the subject invention that utilize such alternative handle assemblies, the handle 38 is freely held in one hand by the operator 14 while the knob or other grasping means is held in the other hand of the operator 14.

The method continues by estimating the external force applied at the tool 26. In either embodiment of the subject method invention, the external force is more specifically estimated by estimating both a magnitude and a direction of the external force. The manner in which the external force is estimated depends on whether the operator 14 has determined to utilize the handle assembly 12 to teach the robot assembly 10 or whether the operator 14 had determined to directly hold and lead the tool 26 to teach the robot assembly 10. If the operator 14 has determined to utilize the handle assembly 12, then the external force applied at the tool 26 is estimated by the three-degree of freedom force sensor 66 associated with the handle assembly 12. As discussed above, the three-degree of freedom force sensor 66 of the preferred embodiment operates with the universal joint 52 of the handle assembly 12 to sense each of the three-degrees of freedom provided by the universal joint 52.

Alternatively, if the handle assembly 12, and therefore the three-degree of freedom force sensor 66, is not utilized, then the external force applied at the tool 26 is estimated independent of any force sensor 66 by monitoring a torque of the motor 28. If the robot assembly 10 is in the translational mode, then the torque of the motor 28 is monitored to estimate the external force. Alternatively, if the robot assembly 10 is in the rotational mode, then the torque of the motor 28 is monitored to estimate the external moment. To monitor the torque of a particular motor 28 in the robot assembly 10, first at least one robot axis is designated. The motor 28 disposed at this robot axis is the motor 28 where the motor torque is to be monitored. Although only one axis need be designated, it is possible for more than one robot axis, and therefore more than one motor 28, to be monitored. In these cases where more than one robot axis is monitored, the preferred robot axes that are monitored are the robot axes associated with the wrist arm 24 or wrist arms of the robot assembly 10. The robot axes associated with the wrist arm 24 or wrist arms of the robot assembly 10 are defined between the tool 26 and the wrist arm 24. In general, the wrist arms carry less weight and, as a result, the mechanical structure of the motors utilized to move these wrist arms is less complex relative to other motors such that monitoring the torque of these motors is ideal. It is to be understood that the preferred measure of the motor torque of the motor 28 associated with the designated robot axis is related to the amount of electrical current conveyed to the respective motor 28.

Next, a motion command is generated in response to the external force that has been estimated. As appreciated, the controller 30 generates the motion command. The controller 30 generates the motion command based on thee external force estimated by either the force sensor 66 or by the step of monitoring the motor torque. The motion command is intended to supplement the movement imparted on the tool 26 in the direction of the estimated external force. More specifically, the controller 30 of the robot assembly 10 is operatively connected to the motor 28, and the controller 30 receives data representing the external force. With this data, the controller 30 generates a corresponding motion command. The motion command from the controller 30 powers the motor 28 or motors of the robot assembly 10 to supplement the movement imparted on the tool 26 in the direction of the estimated external force. As such, the robot operator 14 is assisted in moving the robot arm 16 throughout the lead-through teaching method. The estimated external force is determined by estimating the motor torque associated with a current state of the robot assembly 10 based on static and dynamic parameters of the robot assembly 10 and comparing the estimated motor torque to the monitored motor torque and processing the result. Such static parameters include, but are not limited to, gravity, and such dynamic parameters include, but are not limited to, the current motion command. Typically, in the translational operating mode, the estimated external force is interpreted as a force applied at the TCP, and in the rotational operation mode, the estimated external force is interpreted as a moment about the TCP.

The method continues by the operator 14 selecting one or both of the teach operating modes. To select, the operator 14 utilizes the operating mode switch 54. It is to be understood that if the operator 14 is utilizing the handle assembly 12, then the operating mode switch 54, as already discussed, is disposed on the handle 38. If the operator 14 is not utilizing the handle assembly 12, then the operating mode switch 54 can be disposed directly on the robot assembly 10 or external from the robot assembly 10 preferably in the workspace of the robot assembly 10 for efficient access.

As discussed above, the mode that is selected depends upon the desired operating path to be taught to the robot assembly 10. If the operator 14 selects only the translational mode to teach the robot assembly 10, then all rotational movement involving the second three-degrees of freedom (w, p, r) of the tool 26 is prevented. Similarly, if the operator 14 selects only the rotational operating mode to teach the robot assembly 10, then all translational movement involving the first three-degrees of freedom (x, y, z) of the tool 26 is prevented. Realistically, the movement, either translational or rotational, of the tool 26 is prevented by limiting the corresponding movement throughout the entire robot assembly 10 including the robot arm 16 or arms 16. As described above, both translational and rotational sub-modes can exist to group motion of the robot assembly 10 into modes of one-degree, two-degrees, and three-degrees of freedom.

It is also possible for the operator 14 to select both the translational operating mode and the rotational operating mode at the same time. As such, the movement along the desired operating path during the lead-through teaching method occurs in both the first and second three-degrees of freedom (x, y, z and w, p, r). That is, movement of the entire robot assembly 10 is not limited between translational and rotational movement such that movement of the robot assembly 10, and therefore teaching of the robot assembly 10, can occur in six-degrees of freedom (x, y, z and w, p, r). If the operator 14 selects both operating modes at the same time to teach the robot assembly 10, then it may be necessary to incorporate additional ways to sense and estimate the external force. For example, a three-degree of freedom force sensor 66 could be utilized in conjunction with motor torque monitoring. That is, the three-degree of freedom force sensor 66 could be assigned to sense and estimate the external force is some degrees of freedom and the torque monitoring could be assigned to sense and estimate the external force in the remaining degrees of freedom.

The methods introduced according to the subject invention can be combined with other methods of teaching robot assemblies 10. For example, it is understood by those skilled in art that one or more robot axes may have no moment due to gravity, and that through mechanical configuration, or through physical or servo balancing, these robot axes can be released from standard servo control. As such, specific degrees of freedom are not controlled by the motion command but are physically moved by the robot operator 14. Furthermore, motion of these robot axes can be detected and combined with motor torque from one or more other robot axes to estimate the external force and generate a motion command for the desired motion of the robot assembly 10. This example is especially useful when the external force can only be reliably estimated in fewer than three-degrees of freedom by monitoring motor torque alone.

Throughout the lead-through teaching process, the operator 14 utilizes the position-record button 40 to record the position of the robot assembly 10, along the desired operating path. It is to be understood that if the operator 14 is utilizing the handle assembly 12, then the position-record button 40, as already discussed, is disposed on the handle 32. Also, in the embodiment utilizing the handle assembly 12, it is the force sensor 66 that provides information representative of the position of the robot assembly 10 to the controller 30. If the operator 14 is not utilizing the handle assembly 12, then the position-record button 40 can be disposed directly on the robot assembly 10 or external from the robot assembly 10 preferably in the workspace of the robot assembly 10 for efficient access. Alternatively, the handle 38 can be external from the entire handle assembly 12 and held in one hand of the robot operator 14 while the operator 14 grasps the tool 26 of the robot assembly 10 and imparts motion on the robot assembly 10 with his or her other hand. In embodiments without the handle assembly 12, the method of monitoring the motor torque provides information representative of the position of the robot assembly 10 to the controller 30. After the desired operating path has been taught by recording the position of the robot assembly 10 along the desired operating path a plurality of times, the position of the robot assembly 10 along the desired operating path can be played-back.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that reference numerals are merely for convenience and are not to be in any way limiting, the invention may be practiced otherwise than as specifically described.

What is claimed is:

1. A lead-through teach handle assembly for assisting a user in teaching a desired operating path to a robot including at least one robot arm in a robot workspace, said assembly comprising:

a mounting mechanism adapted to be mounted to various mounting sites on the robot arm;

a handle supported by said mounting mechanism, said handle adapted to provide at least one surface for the user to grasp such that the user can apply an external force required to move the arm of the robot along the desired operating path;

said assembly characterized by a first joint member mounted to said handle and a second joint member mounted to said mounting mechanism, said first and second joint members coupled together to interconnect said handle and said mounting mechanism and to accommodate orientation changes of said handle relative to said mounting mechanism resulting from translational and rotational movement of the robot arm as the user is teaching the robot the desired operating path.

2. An assembly as set forth in claim 1 wherein each of said first and second joint members are further defined as a connection yoke and a rotational coupling, said connection yokes and said rotational couplings being coupled together to establish a universal joint providing three-degrees of freedom of rotational movement.

3. An assembly as set forth in claim 2 further including a force sensor disposed between said universal joint and said mounting mechanism for sensing the external force applied at the arm of the robot.

4. An assembly as set forth in claim 3 wherein said force sensor is further defined as a three-degree of freedom force sensor for sensing each of the three-degrees of freedom provided by said universal joint.

5. An assembly as set forth in claim 3 wherein said mounting mechanism is further defined as a magnetic mounting device adapted to be detachably mounted to the various mounting sites on the robot arm such that said handle detaches from the robot arm when the external force applied by the user exceeds a predetermined force limit.

6. An assembly as set forth in claim 2 further including an extension shaft disposed between said handle and said universal joint, said extension shaft adapted to extend a reach of the user when moving the robot arm along the desired path.

7. An assembly as set forth in claim 6 wherein said extension shaft includes a first end mounted to said handle and a second end mounted to said universal joint.

8. An assembly as set forth in claim 6 wherein said extension shaft includes a plurality of shaft sections that slidably extend from one another such that said second end of said extension shaft telescopes outwardly from said first end of said extension shaft and the reach of the user varies as necessary when moving the robot arm along the desired path.

9. An assembly as set forth in claim 8 further including a hand support extending from said second end of said extension shaft, said hand support adapted to provide a second surface for the user to grasp to assist the user in applying the external force.

10. An assembly as set forth in claim 2 further including an operating mode switch disposed on said handle for allowing the user to select at least one teach operating mode depending upon the desired operating path to be taught wherein the selected teach operating mode distinguishes between (i) a translational operating mode which defines a first three-degrees of freedom of movement and limits the movement imparted on a tool to translational movement such that a first spacial relationship defined between an orientation of the tool and the workspace is maintained during teaching, and (ii) a rotational operating mode which defines a second three-degrees of freedom of movement and limits the movement imparted on the tool to rotational movement such that a second spacial relationship defined between a tool center point and the workspace is maintained during teaching.

11. An assembly as set forth in claim 10 wherein said universal joint is adapted to permit the movement of the robot arm in the first three-degrees of freedom when said operating mode switch selects the translational operating mode, and to permit the movement of the robot arm in the second three-degrees of freedom when said operating mode switch selects the rotational operating mode.

12. An assembly as set forth in claim 11 further including a position-record button disposed on said handle for recording a position of the robot along the desired operating path.

13. An assembly as set forth in claim 11 further including a deadman switch disposed on said handle and extending outwardly from said surface provided by said handle, said deadman switch operates between a first position where said deadman switch is depressed and the robot is activated such that teaching of the robot is possible, and a second position where said deadman switch is released and the robot is deactivated such that teaching of the robot is not possible.

14. A robot assembly comprising:
at least one robot arm including at least one mounting site;
a mounting mechanism mounted to said mounting site on said robot arm;
a handle supported by said mounting mechanism, said handle adapted to provide at least one surface for a user to grasp such that the user can input a force required to move said robot arm along a desired operating path;
said assembly characterized by a first joint member mounted to said handle and a second joint member mounted to said mounting mechanism, said first and second joint members coupled together to interconnect said handle and said mounting mechanism and to accommodate orientation changes of said handle relative to said mounting mechanism resulting from translational and rotational movement of said robot arm as the user is teaching the desired operating path.

15. An assembly as set forth in claim 14 wherein each of said first and second joint members are yokes coupled together to establish a universal joint having three-degrees of freedom.

16. An assembly as set forth in claim 15 further including a force sensor disposed between said universal joint and said mounting mechanism for sensing the external force applied at said robot arm.

17. An assembly as set forth in claim 16 wherein said force sensor is further defined as a three-degree of freedom force sensor for sensing each of the three-degrees of freedom provided by said universal joint.

18. An assembly as set forth in claim 16 further including a motor for moving said robot arm, and a controller operatively connected to said motor, said controller receiving data representing the external force sensed by said force sensor and generating motion commands in response to the sensed external force to power said motor and supplement the movement of said robot arm along the desired operating path.

19. An assembly as set forth in claim 15 further including an operating mode switch disposed on said handle for allowing the user to select at least one teach operating mode depending upon the desired operating path to be taught wherein the selected teach operating mode distinguishes between (i) a translational operating mode which defines a first three-degrees of freedom of movement and limits the movement imparted on a tool mounted to said robot arm to translational movement such that a first spacial relationship defined between an orientation of the tool and the workspace is maintained during teaching, and (ii) a rotational operating mode which defines a second three-degrees of freedom of movement and limits the movement imparted on the tool to rotational movement such that a second spacial relationship defined between a tool center point and a robot workspace is maintained during teaching.

20. An assembly as set forth in claim 19 wherein said universal joint permits the movement of said robot arm in the first three-degrees of freedom when said operating mode switch selects the translational operating mode, and permits the movement of said robot arm in the second three-degrees of freedom when said operating mode switch selects the rotational operating mode.

21. A method of teaching a robot assembly a desired operating path within a workspace wherein the robot assembly includes at least one robot arm, a motor, and a tool having a tool center point and an orientation, said method comprising the steps of:
   applying an external force at the tool to impart movement on the robot arm such that the arm of the robot assembly moves along the desired operating path wherein the imparted movement is at least one of translational movement and rotational movement;
   estimating the external force applied at the tool;
   generating motion commands in response to the external force to supplement the movement imparted on the tool in a direction of the estimated external force thereby assisting a user in moving the robot arm; and
   selecting at least one teach operating mode depending upon the desired operating path to be taught wherein the selected teach operating mode distinguishes between (i) a translational operating mode which defines a first three-degrees of freedom of movement and limits the movement imparted on the tool to translational movement such that a first spacial relationship defined between the orientation of the tool and the workspace is maintained during teaching, and (ii) a rotational operating mode which defines a second three-degrees of freedom of movement and limits the movement imparted on the tool to rotational movement such that a second spacial relationship defined between the tool center point and the workspace is maintained during teaching.

22. A method as set forth in claim 21 wherein the step of selecting at least one teach operating mode is further defined as selecting at least one of a translational operating sub-mode and a rotational operating sub-mode, wherein the translational operating sub-mode limits the movement imparted on the tool to fewer than the first three-degrees of freedom, and the rotational operating sub-mode limits the movement imparted on the tool to fewer than the second three-degrees of freedom.

23. A method as set forth in claim 21 wherein the step of applying the external force at the tool is further defined as manipulating a lead-through teach handle assembly which includes a universal joint having three-degrees of freedom and is mounted on the robot arm to apply the external force required to move the robot arm along the desired operating path.

24. A method as set forth in claim 23 wherein the step of estimating the external force applied at the tool is further defined by sensing each of the three-degrees of freedom provided by the universal joint with a three-degree of freedom force sensor.

25. A method as set forth in claim 24 wherein the step of estimating the external force is further defined as estimating both a magnitude and a direction of the external force.

26. A method as set forth in claim 24 wherein the step of selecting at least one teach operating mode is further defined by preventing rotational movement of the tool when the translational operating mode is selected and by preventing translational movement of the tool when the rotational operating mode is selected.

27. A method as set forth in claim 24 further including the step of powering the motor of the robot assembly in response to the generated motion command to supplement the movement imparted on the tool in the direction of the estimated external force.

28. A method as set forth in claim 24 wherein the step of selecting at least one teach operating mode is further defined by selecting both the translational operating mode and the rotational operating mode such that movement along the desired operating path occurs in both the first and second three-degrees of freedom.

29. A method as set forth in claim 24 further including the step of recording a position of the robot assembly along the desired operating path.

30. A method as set forth in claim 29 further including the step of playing-back the position of the robot assembly along the desired operating path after the position of the robot assembly has been recorded.

31. A method as set forth in claim 21 wherein the step of applying the external force at the tool is further defined as manually holding the tool of the robot assembly and leading the tool and the robot arm through the desired operating path.

32. A method as set forth in claim 31 wherein the step of estimating the external force applied at the tool is further defined by monitoring a torque of the motor to estimate the external force.

33. A method as set forth in claim 32 wherein the step of estimating the external force is further defined as estimating both a magnitude and a direction of the external force.

34. A method as set forth in claim 32 wherein the step of selecting at least one teach operating mode is further defined by preventing rotational movement of the tool when the translational operating mode is selected and by preventing translational movement of the tool when the rotational operating mode is selected.

35. A method as set forth in claim 32 further including the step of powering the motor of the robot assembly in response to the generated motion command to supplement the movement imparted on the tool in the direction of the estimated external force.

36. A method as set forth in claim 32 wherein the step of selecting at least one teach operating mode is further defined by selecting both the translational operating mode and the rotational operating mode such that movement along the desired operating path occurs in both the first and second three-degrees of freedom.

37. A method as set forth in claim 32 further including the step of recording a position of the robot assembly along the desired operating path.

38. A method as set forth in claim 37 further including the step of playing-back the position of the robot assembly along the desired operating path after the position of the robot assembly has been recorded.

39. A method as set forth in claim 32 wherein the step of monitoring the torque of the motor is further defined by selecting at least one robot axis where the torque of the motor is monitored.

40. A method as set forth in claim 39 wherein the at least one arm of the robot assembly is more specifically defined to include a base arm connected to a robot base, a main arm connected to the base arm, and a wrist arm that supports the tool and is connected to the main arm, wherein the step of selecting at least one robot axis is further defined by selecting a wrist axis defined between the tool and the wrist arm where the torque of the motor is to be monitored.

* * * * *